No. 754,589. PATENTED MAR. 15, 1904.
G. W. MINTO.
ROPE HAULAGE SOCKET.
APPLICATION FILED AUG. 26, 1903.
NO MODEL.

Witnesses:
F. H. Butler.
E. E. Potter.

Inventor
G. W. Minto
By A. C. Forth
Attorneys.

No. 754,589. Patented March 15, 1904.

UNITED STATES PATENT OFFICE.

GEORGE W. MINTO, OF GINTER, PENNSYLVANIA.

ROPE-HAULAGE SOCKET.

SPECIFICATION forming part of Letters Patent No. 754,589, dated March 15, 1904.

Application filed August 26, 1903. Serial No. 170,858. (No model.)

*To all whom it may concern:*

Be it known that I, GEORGE W. MINTO, a citizen of the United States of America, residing at Ginter, in the county of Clearfield and State of Pennsylvania, have invented certain new and useful Improvements in Rope-Haulage Sockets, of which the following is a specification, reference being had therein to the accompanying drawings.

This invention relates to certain new and useful improvements in rope-haulage bearings, and is particularly adapted for use in connection with rollers or pulleys over which the rope or cable is adapted to travel and which are employed generally in connection with inclines, mine-roads, and the like.

The object of the present invention is to provide a bearing in which the roller or pulley may be securely retained, but which may be easily detached from the socket when desired.

Briefly described, the invention comprises a bearing embodying a body portion provided in its end with a recess and in one side wall with a slot or opening leading into said recess above the center thereof. The body portion is provided with an apertured flanged base adapted to receive securing means for fastening the bearing to the sleeper or cross-ties of the track.

A further object of my invention is to provide a device of this type which may be spiked directly to the upper faces of the cross-ties without modifying said ties or without making any other provision whatever save the positioning of the cross-ties in a manner common to the well-known railway-track cross-ties, in which the ties are located upon a bed in parallel relation and spaced apart; further, the ease with which the device may be applied, spikes being the only medium of securement employed and whose use is in every particular the same as the well-known spiking of rails to cross-ties in railroading.

In describing the invention in detail, reference is had to the accompanying drawings, forming a part of this specification and wherein like numerals of reference indicate like parts throughout the several views, in which—

Figure 1:
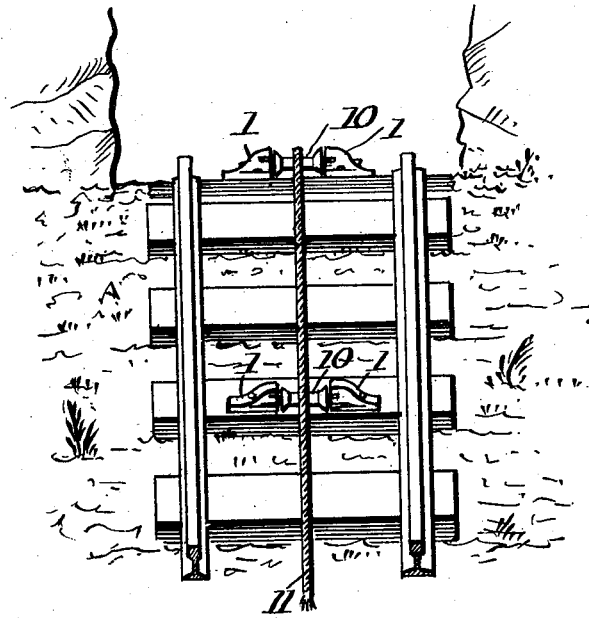
Figure 2:
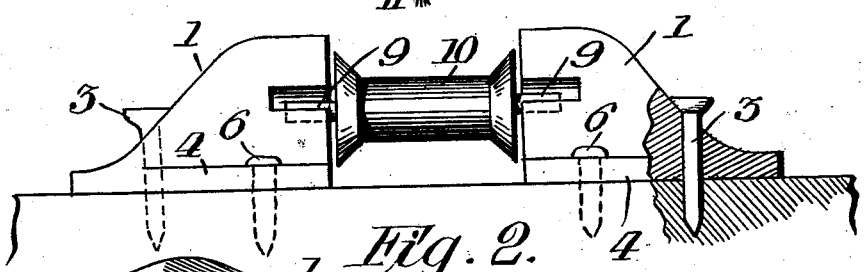
Figure 3:
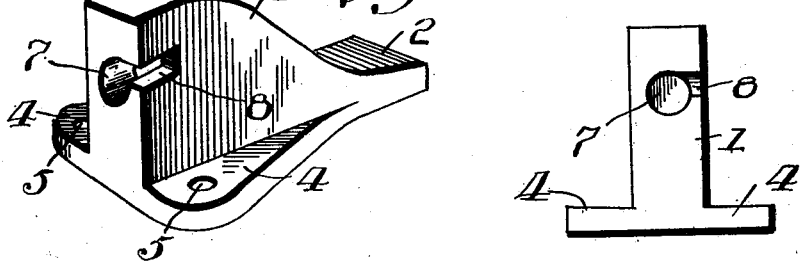
Figure 4:
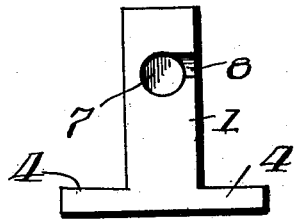

Figure 1 is a plan view showing the application of my improved rope-haulage bearing. Fig. 2 is a front view showing a portion of one of the bearings in section to better illustrate the securing means. Fig. 3 is a detached detail perspective view of the bearing. Fig. 4 is an end elevation thereof.

The device comprises a body 1, the top wall of which is cut away at the rear end, forming a projection 2, which is provided with an aperture through which is adapted to be inserted the securing-spike 3. The top is also cut away at the sides to form the flanges 4 on the base, which are provided with openings 5 to receive securing-spikes 6. The body part 1 is formed with a journal-bearing recess 7 on its inner face, said bearing running longitudinally of the body part, and a slot 8 is cut through the body part, the center of said slot being above the center of the recess 7, so that the recess will retain an axle or bearing placed therein. An axle 9, which carries a roller 10, is adapted to fit the bearings produced by the recesses 7, being placed in position by passing its ends through the slots 8, and as the pressure of the rope or cable 11, traveling over the rollers 10, is always against the rollers the same will be held in their seats or recesses 7 at all times. In case it is desired to remove the roller or pulley the same is lifted so as to remove the axle through the side openings 8.

In the practice of the invention it will be observed that various changes may be made in the details of construction without departing from the general spirit of my invention.

Having fully described my invention, what I claim as new, and desire to secure by Letters Patent, is—

A bearing for rope-haulage apparatus comprising pairs of body portions oppositely disposed with a space therebetween, each body consisting of a flange at the base thereof, said flange extending at the sides and rear end of the base therebeyond and being apertured, with spikes passing through said apertures to have their heads seated on the base-flange at the upper face thereof, the bodies being arranged on the upper face of a cross-tie, the inner faces of each of the bodies having a cylindrical recess formed therein, running lengthwise of the body, one side wall of each of the bodies having a slot therein the center of which is out of alinement with and located above the center of the said cylindrical recesses, said slots communicating with said cylindrical recesses, with an axle carrying a roller, the ends of the axle being received in said cylindrical recesses, the slots in the side walls being of a width to receive the said axle ends.

In testimony whereof I affix my signature in the presence of two witnesses.

GEORGE W. MINTO.

Witnesses:
HARRY BOULTON,
W. P. HARPSTER.